(12) United States Patent
Smith et al.

(10) Patent No.: US 12,208,396 B2
(45) Date of Patent: Jan. 28, 2025

(54) CAPILLARY TUBE HOLDER FOR AUTOSAMPLER

(71) Applicant: Elemental Scientific, Inc., Omaha, NE (US)

(72) Inventors: Scott Smith, Honey Creek, IA (US); Tyler Yost, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 207 days.

(21) Appl. No.: 16/510,354

(22) Filed: Jul. 12, 2019

(65) Prior Publication Data

US 2020/0016600 A1 Jan. 16, 2020

Related U.S. Application Data

(60) Provisional application No. 62/696,903, filed on Jul. 12, 2018.

(51) Int. Cl.
*B01L 9/06* (2006.01)

(52) U.S. Cl.
CPC ......... *B01L 9/065* (2013.01); *B01L 2200/025* (2013.01); *B01L 2300/0838* (2013.01)

(58) Field of Classification Search
CPC ...... B01L 9/00; B01L 9/065; B01L 2200/025; B01L 2300/045; B01L 2300/0838
See application file for complete search history.

(56) References Cited

U.S. PATENT DOCUMENTS

| 5,000,419 | A | 3/1991 | Palmer et al. |
| 2004/0034330 | A1 | 2/2004 | Bierman et al. |
| 2007/0276334 | A1 | 11/2007 | Bierman et al. |
| 2010/0114034 | A1* | 5/2010 | Wright ................. A61M 25/02 604/177 |
| 2019/0270568 | A1* | 9/2019 | Wise ................. B65D 83/0077 |

FOREIGN PATENT DOCUMENTS

| JP | 2004049319 A | * | 2/2004 |
| JP | 2017009086 A | | 1/2017 |
| KR | 200400206 Y1 | | 11/2005 |

OTHER PUBLICATIONS

International Search Report and Written Opinion for PCT/US2019/041631, dated Oct. 30, 2019.

* cited by examiner

*Primary Examiner* — Matthew D Krcha
*Assistant Examiner* — Austin Q Le
(74) *Attorney, Agent, or Firm* — Kevin E. West; Advent, LLP

(57) ABSTRACT

A capillary tube holder is provided for holding a capillary tube. The capillary tube holder includes a holder insert and a holder base. The holder insert includes a capillary groove configured for receiving the capillary tube. The holder base is configured for slidably receiving and retaining the holder insert therein.

16 Claims, 4 Drawing Sheets

CAPILLARY TUBE HOLDER FOR AUTOSAMPLER

BACKGROUND

Automatic sampling systems (e.g., autosamplers) can facilitate sampling of many different samples from vials positioned adjacent a sample probe. The sample probe is supported by an autosampler arm that moves from sample position to sample position and can move the sample probe along x-, y-, and z-axes. The sample probe draws samples into a capillary line for sample preparation or analysis through action of a pump or vacuum source.

DRAWINGS

The Detailed Description is described with reference to the accompanying figures.

DETAILED DESCRIPTION

Overview

Figure 1:
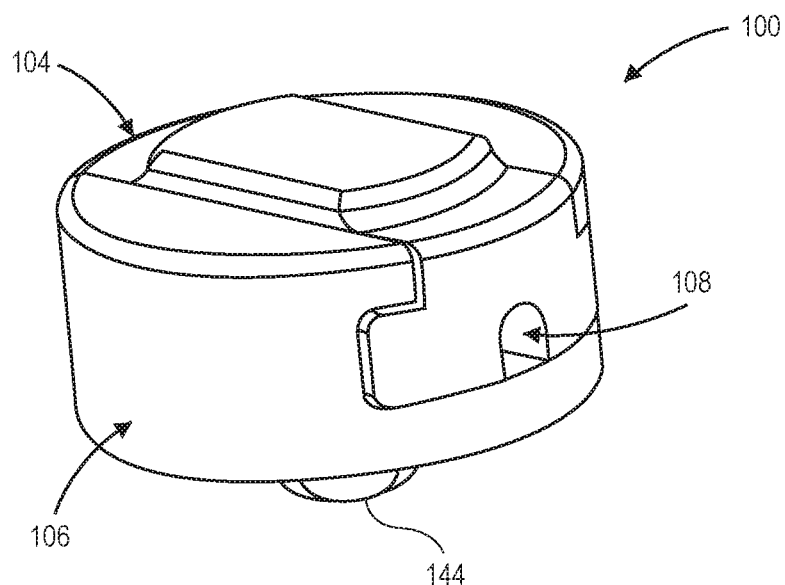
FIG. 1 is an isometric view of an assembled capillary tube holder, in accordance with an embodiment of the present disclosure.
Figure 2A:
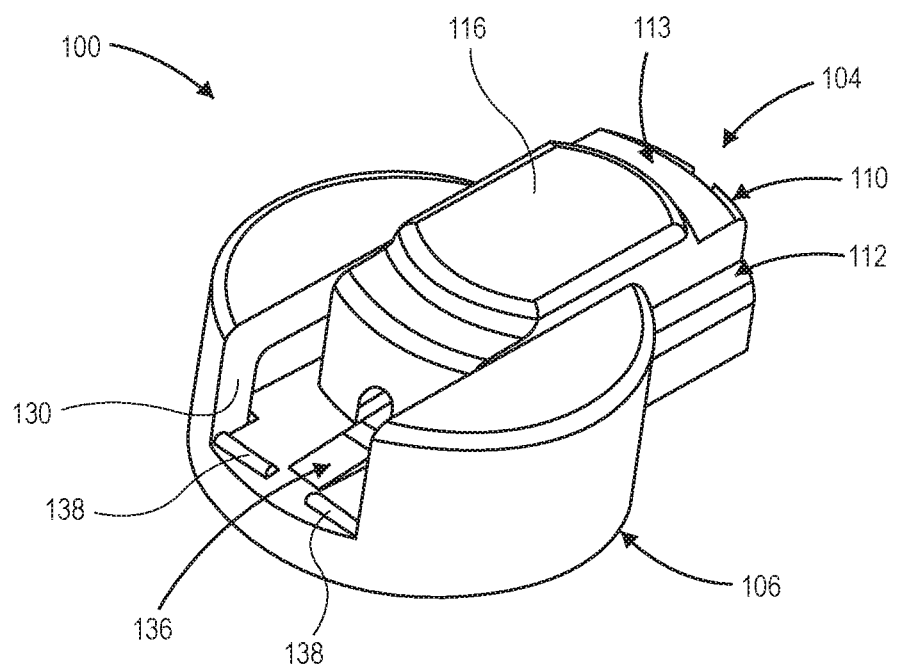
FIG. 2A is a top, isometric view of the capillary tube holder of FIG. 1, in a partially assembled state.
Figure 2B:
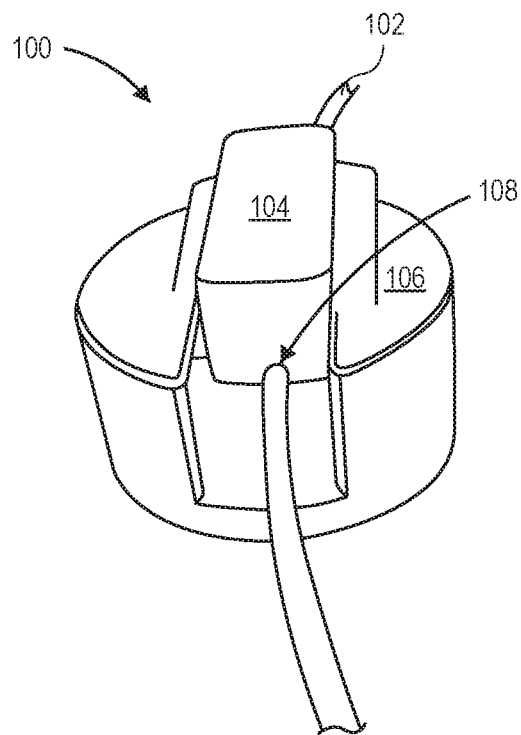
FIG. 2B is a top, isometric photographic view of a capillary tube holder, generally constructed in a manner consistent with the capillary tube holder shown in FIGS. 1 and 2A, with a tube in place.
Figure 3:
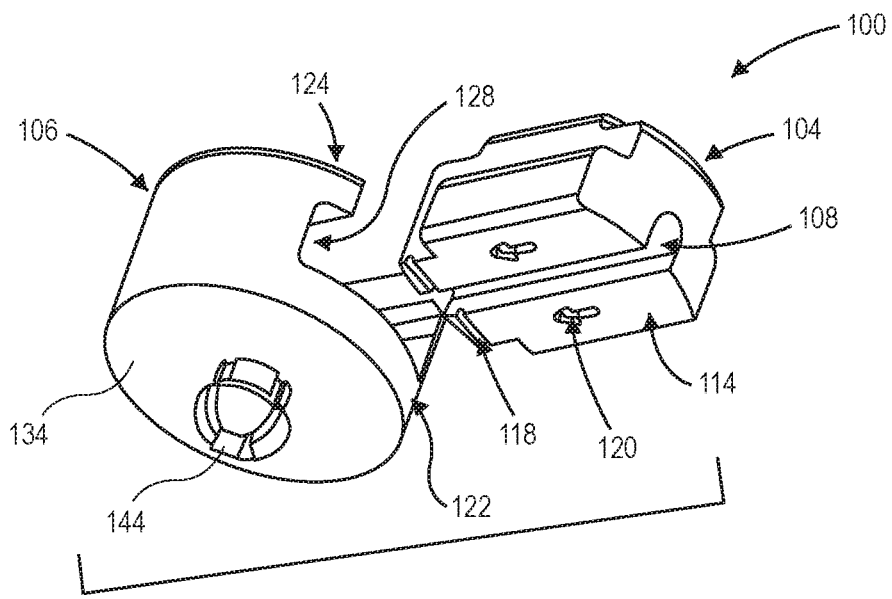
FIG. 3 is a bottom, isometric, exploded view of the capillary tube holder of FIGS. 1 and 2A.
Figure 4:
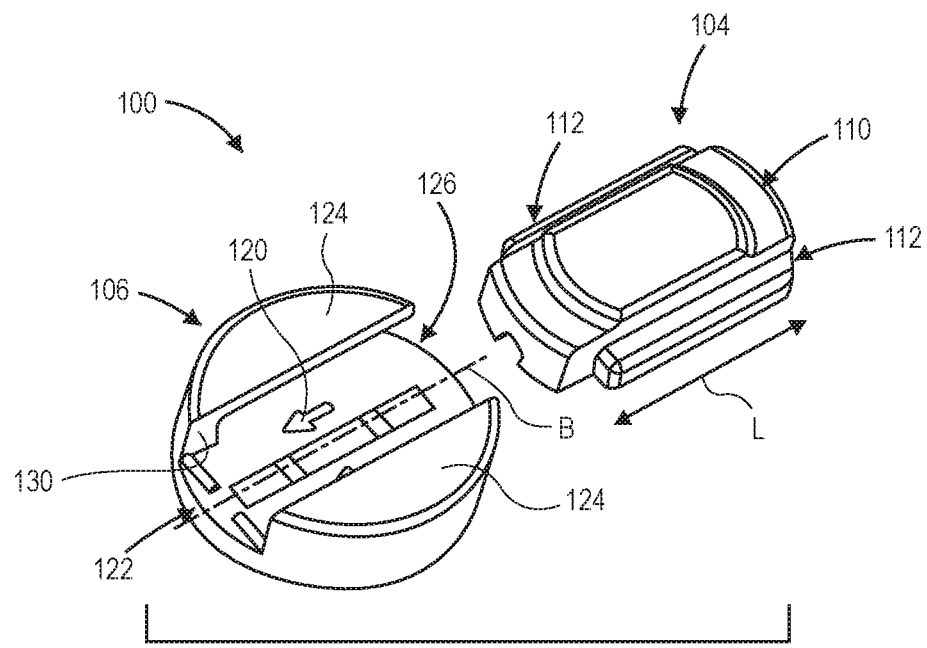
FIG. 4 is a top, isometric, exploded view of the capillary tube holder of FIGS. 1 and 2A.

During movement of the sample probe by the auto sampler arm, the capillary line can move around, potentially getting tangled on equipment pieces, kinked, or otherwise inhibit flow of fluid through the capillary line due to positioning of the capillary line. Additionally, movement of the autosampler arm can cause the capillary line to be removed from connection with the probe, which can cause samples to be missed and/or require recalibration of the autosampler.

Responsive thereto, a capillary tube holder can be provided that can include two pieces that fit together to secure the capillary line (e.g., 1/16" outer diameter line, or other capillary line) with evenly applied pressure to avoid kinking of the line. The base piece can include a protrusion (e.g., a snap-fit pivot) to fit into an aperture at the top of the autosampler arm to allow the capillary tube holder to spin on top of the arm while the arm moves the sample probe from sample position to sample position. Alternatively, the protrusion can fit into another aperture to position the capillary tube holder as needed (e.g., downstream from the autosampler). The present capillary tube holder can be used with any of a variety of autosamplers, such as those disclosed in U.S. Pat. No. 7,201,072 and in U.S. Pat. No. 9,523,700. The contents of U.S. Pat. Nos. 7,201,072 and 9,523,700 are hereby incorporated by reference thereto.

Example Implementations

FIGS. 1-4 show a capillary tube holder 100 for holding a capillary tube 102 (with the capillary tube 102 being particularly shown in FIG. 2B), in accordance with an example embodiment of the present disclosure, the combination of which may be considered to be a fluid delivery system. The capillary tube holder 100 generally includes a holder insert 104 and a holder base 106. The holder insert 104 is slidably received within the holder base 106, as indicated in the partial assembled views of FIGS. 2A and 2B. When assembled (FIG. 1), the holder insert 104 and the holder base 106 can generally define a disk shape, with a generally consistent diameter (e.g., a constant composite diameter). Accordingly, any perimeter edges associated with either the holder insert 104 or the holder base 106 can be arcuate, as needed, to accommodate the desired disk shape of the assembled capillary tube holder 100. The capillary tube 102 is received between the holder insert 104 and the holder base 106 within a tube-receiving groove 108 defined within the holder insert 104.

Figure 5:
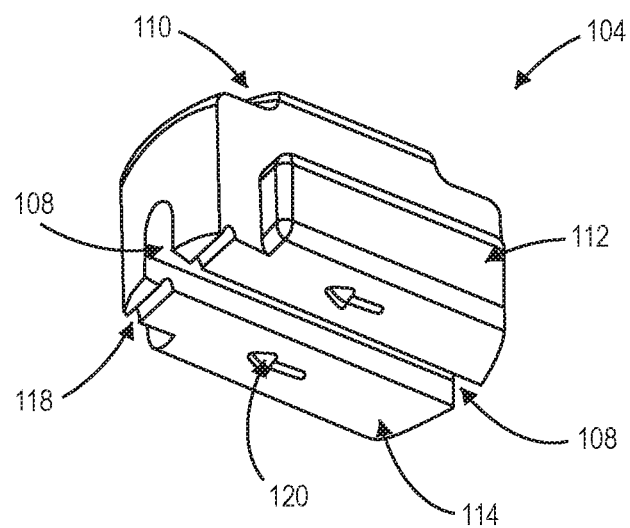
FIG. 5 is a bottom, isometric view of a holder insert, in accordance with an embodiment of the present disclosure.

The holder insert 104, shown alone in FIG. 5, can include a central insert portion 110 and a pair of side extensions 112. The central insert portion 110 and the pair of side extensions 112 may be integrally formed with one another. The central insert portion 110 has an associated longitudinal direction L, which extends in the lengthwise orientation thereof. The holder insert 104 can include a top insert face 113 and a bottom insert face 114, where the bottom insert face 114 is configured to face the holder base 106 upon sliding the holder insert 104 into the holder base 106. It is to be understood that any edges and/or corners of the holder insert 104 may be beveled, as desired (e.g., to promote sliding and/or to promote ease of handling). The central insert portion 110 can be thicker in cross section than the side extension portions 112 (for reasons to be discussed later). The central insert portion 110 further can be longer than each of the side extension portions 112, for reasons that will become apparent upon discussing the interaction of the holder insert 104 with the holder base 106.

The top insert face 113 may particularly be associated with the central insert portion 110 and may include a top raised portion 116. The top raised portion 116 may aid in gripping of the holder insert 104 when sliding it into and out of position relative to the holder base 106. The top raised portion 116 may be defined by a distal set of convex, arcuate edges and a pair of straight, longitudinal edges (shown but not labelled).

The bottom insert face 114 can have the tube-receiving groove 108 and at least one locking groove 118 (two of which are shown) formed therein. The tube-receiving groove 108 can bisect the bottom insert face 114 and, likewise, the central insert portion 110, while running in the longitudinal direction L. In an embodiment, the tube-receiving groove 108 can be semi-oval in shape (e.g., a semi-circular upper portion and an opposed pair of parallel side walls adjacent the groove opening). The locking groove(s) 118 can be generally perpendicular to the tube-receiving groove 108 (e.g., one on either side of the tube-receiving groove 108) and can be located in the section of the central insert portion 110 that is longer than the side extension portions 112. The bottom insert face 114 may also have one or more assembly arrows 120 associated therewith (e.g., formed therein or thereon), to indicate the assembly (i.e., insert) direction for the holder insert 104, relative to the holder base 106.

Figure 6:
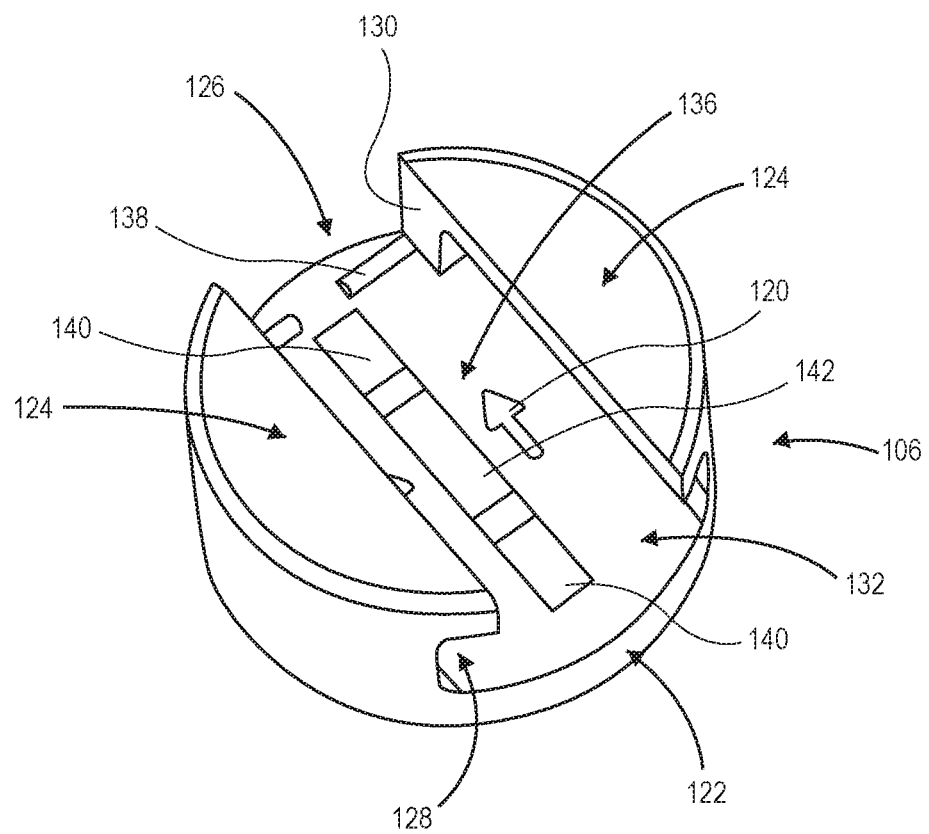
FIG. 6 is a top, isometric view of a holder base, in accordance with an embodiment of the present disclosure.

The holder base 106, shown alone in FIG. 6, can generally include a base platform 122 and an opposed pair of insert receiver portions 124. In an embodiment, the opposed pair of insert receiver portions 124 may be integrally formed or otherwise attached with the base platform 122. The opposed pair of insert receiver portions 124 are located on and extend from the base platform 122 and spaced from one another. In an embodiment, the pair of insert receiver portions 124 and the base platform 122 define a receiver zone configured to receive the holder insert 104 therein. The pair of insert receiver portions 124, along with the base platform 122, can define a central-insert-portion receiving slot 126 in the gap therebetween. The insert receiver portions 124 each further respectively define a side-extension receiving notch 128 (which may be considered a receiving groove when considered in combination with the base platform 122) and a forward stop 130. In an embodiment, the central-insert-portion receiving slot 126 and side-extension receiving notches 128 together can define the receiving zone for the holder insert 104. Upon assembly, a section of the central insert portion 110 can slide between and may abut the pair of insert receiver portions 124, while each respective side-extension receiving notch 128 can receive a corresponding side extension portion 112, with the insert motion (e.g., along the longitudinal direction L) being limited, at least in part, by the pair of forward stops 130.

The base platform 122 can have a circular perimeter, matching the overall disk shape of the capillary tube holder 100, and can define a platform top 132 and an opposed platform bottom 134. The platform top 132 can be configured to face the holder insert 104 when assembled with the holder base 106. The platform top 132 can define a central rail 136 and at least one insert engagement ridge 138 and may further include one or more assembly arrows 120 associated therewith (e.g., formed therein or thereon). Like those used with the holder insert 104, the one or more arrows 120 with the platform top 132 can indicate the assembly (i.e., insert) direction for the holder insert 104, relative to the holder base 106. The platform top 132 may further be sloped upwardly in the insertion direction enough to promote a force or press fit between the holder insert 104 and the holder base 106 upon assembly.

The central rail 136 and the at least one engagement ridge 138 can be provided to help hold the capillary tube 102 and/or the holder insert 104 in place relative to the holder base 106. The central rail 136 is located along a platform top bisector B (e.g., diametrical line), parallel to the insert direction of the longitudinal direction L and located equidistant between the insert receiver portions 124. The central rail 136 can be configured to be inserted/positioned in the tube-receiving groove 108 and to engage the capillary tube 102 (e.g., form a friction fit with the capillary tube 102 yet not significantly impede any flow therethrough). The central rail 136 may have a pair of distal sloped portions 140 and a raised central portion 142. The distal sloped portions 140 may aid insertion and/or removal of the capillary tube 102, while the raised central portion 142 may aid retention of the capillary tube 102 (i.e., causing an amount of elastic deformation in the capillary tube 102, yielding a force fit or press fit between the central rail 136, the capillary tube 102, and the tube-receiving groove 108 of the holder insert 104).

The at least one engagement ridge 138 can be formed in a cross-direction to the platform top bisector B (e.g., one engagement ridge 138 on either side of the platform top bisector 138) and can be configured to engage a corresponding locking groove 118 of the bottom insert face 114, thereby helping keep the holder insert 104 in place relative to the holder base 106. It is to be understood that the location of the features associated with the platform top 132 and the bottom insert face 114 can switched between the faces (e.g., instead, placing a given engagement ridge 138 on the bottom insert face 114 and forming a locking groove 118 on the platform top 132) and still be within the scope of the present disclosure.

The platform bottom 134 may carry (e.g., via co-molding, fastening, etc.) a pivot element 144 thereon. In an embodiment, the pivot element 144 may be configured to promote a snap fit with an adjoining component (not shown) of the autosampler system or another fluid delivery system. In an embodiment, the pivot element 144 can be centrally located on the platform bottom 134 and otherwise protrude therefrom. The pivot element 144 may be of a segmented construction to facilitate initial collapse and subsequent re-expansion thereof during insertion (i.e., snap-fitting) into a receiving hole (not shown) in, for example, an autosampler arm or another location. The ability of the pivot element 144 to form a pivot joint with a corresponding member or portion of the autosampler, combined with the ability to lock the capillary tube 102 in place relative to the remainder of the structure of the capillary tube holder 102, helps avoid any kinking of the capillary tube 102 during use (e.g., concurrent loss of flow therethrough due to the extreme bending associated with kinking).

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims. Various modifications may be made by those skilled in the art without departing from the scope and spirit of the disclosure.

What is claimed is:

1. A capillary tube holder for holding a capillary tube that has an elongated length, the capillary tube holder comprising:
 a holder base having a platform top that defines an engagement ridge or a locking groove; and
 a holder insert configured to be slidably received and retained within the holder base, the holder insert including a central insert portion and at least one side extension, the central insert portion defining a capillary groove that is elongated in a longitudinal direction for receiving a portion of the elongated length of the capillary tube such that, while the portion of the elongated length of the capillary tube is received by the elongated capillary groove, the elongated length of the capillary tube is collinear with the longitudinal direction, the capillary groove being open to the holder base, a portion of the holder insert facing the platform top defining the other of the locking groove or the engagement ridge, the engagement ridge and the corresponding locking groove configured to engage with one another and thereby retain the holder insert relative to the holder base, the engagement ridge and the corresponding locking groove both elongated in a direction that is transverse to the longitudinal direction,
 wherein the central insert portion and the at least one side portion are configured to slide within the holder base along the longitudinal direction of the capillary groove so that the portion of the elongated length of the capillary tube is held within the capillary groove between the central insert portion and the holder base.

2. The capillary tube holder of claim 1, wherein the holder insert and the holder base together define a disk shape.

3. The capillary tube holder of claim 1, wherein the central insert portion extends above the at least one side extension portion in a thickness direction of the holder insert.

4. The capillary tube holder of claim 1, wherein the holder base defines a base platform and an opposed pair of insert receiver portions, the insert receiver portions extending from the base platform and being spaced from one another, the base platform and the opposed pair of insert receiver portions defining a receiver zone configured to receive the holder insert therein.

5. The capillary tube holder of claim 4, wherein the pair of insert receiver portions and the base platform define a central-insert-portion receiving slot therebetween, the central-insert-portion receiving slot configured to receive the central insert portion of the holder insert.

6. The capillary tube holder of claim 5, wherein at least one of the insert receiver portions defines a side-extension receiving notch, the base platform and a given side-extension receiving notch receiving a corresponding side extension portion of the holder insert.

7. The capillary tube holder of claim 4, wherein the base platform defines a platform top and an opposed platform bottom, the platform top configured to face the holder insert, the platform top defining a central rail, the central rail positioned within the capillary groove of the holder insert and configured to engage the capillary tube.

8. The capillary tube holder of claim 4, wherein the base platform defines a platform top and an opposed platform bottom, the platform top configured to face the holder insert, the platform bottom defining a pivot element, the pivot element configured to form a pivot connection with a corresponding member of an autosampler system.

9. A capillary tube holder for holding a capillary tube that has an elongated length, the capillary tube holder comprising:
 a holder base having a platform top that defines an engagement ridge or a locking groove; and
 a holder insert configured to be slidably received and retained within the holder base, the holder insert defining a capillary groove that is elongated in a longitudinal direction and open to the holder base for receiving a portion of the elongated length of the capillary tube such that, while the portion of the elongated length of the capillary tube is received by the elongated capillary groove, the elongated length of the capillary tube is collinear with the longitudinal direction, a portion of the holder insert facing the platform top defining the other of the locking groove or the engagement ridge, the engagement ridge and the corresponding locking groove configured to engage with one another and thereby retain the holder insert relative to the holder base, the engagement ridge and the corresponding locking groove both elongated in a direction that is transverse to the longitudinal direction,
 wherein the holder insert is configured to slide within the holder base along the longitudinal direction of the capillary groove so that the portion of the elongated length of the capillary tube is held within the capillary groove between the holder insert and the holder base.

10. The capillary tube holder of claim 9, wherein the holder insert and the holder base together define a disk shape.

11. The capillary tube holder of claim 9, wherein the central insert portion extends above the at least one side extension portion in a thickness direction of the holder insert.

12. The capillary tube holder of claim 9, wherein the holder base defines a base platform and an opposed pair of insert receiver portions, the insert receiver portions extending from the base platform and being spaced from one another, the base platform and the opposed pair of insert receiver portions defining a receiver zone configured to receive the holder insert therein.

13. The capillary tube holder of claim 12, wherein the pair of insert receiver portions and the base platform define a central-insert-portion receiving slot therebetween, the central-insert-portion receiving slot configured to receive the central insert portion of the holder insert.

14. The capillary tube holder of claim 13, wherein at least one of the insert receiver portions defines a side-extension receiving notch, the base platform and a given side-extension receiving notch receiving a corresponding side extension portion of the holder insert.

15. The capillary tube holder of claim 12, wherein the base platform defines a platform top and an opposed platform bottom, the platform top configured to face the holder insert, the platform top defining a central rail, the central rail positioned within the capillary groove of the holder insert and configured to engage the capillary tube.

16. The capillary tube holder of claim 12, wherein the base platform defines a platform top and an opposed platform bottom, the platform top configured to face the holder insert, the platform bottom defining a pivot element, the pivot element configured to form a pivot connection with a corresponding member of a fluid delivery system.

* * * * *